Sept. 19, 1972  E. L. VETOR ET AL  3,692,587

MULTICELL STORAGE BATTERY

Filed Aug. 13, 1970

Inventors
E. L. Vetor
H. Faust
By Glenn A. Buse
Attorney

United States Patent Office 3,692,587
Patented Sept. 19, 1972

3,692,587
MULTICELL STORAGE BATTERY
Earl Leon Vetor, Germantown, and Helmuth Faust, Milwaukee, Wis., assignors to Globe-Union Inc., Milwaukee, Wis.
Filed Aug. 13, 1970, Ser. No. 63,467
Int. Cl. H01m 5/00
U.S. Cl. 136—134 R
8 Claims

ABSTRACT OF THE DISCLOSURE

A multicell storage battery having a thermoplastic cover and container and utilizing up-and-over intercell connector construction is provided with a thermoplastic material, preferably an ethylene vinyl acetate compound, which encapsulates the link connecting the battery elements in adjoining cell compartment through a notch in the cell partitions so that the cover is capable of being heat sealed onto the container to obtain welded, fluid-tight joints between the cover and container.

BACKGROUND OF THE INVENTION

Field of invention

This invention relates to storage batteries and, more particularly, to multicell storage batteries utilizing up-and-over intercell connectors and a method for making same.

Description of the prior art

Several types of constructions are known for electrically and mechanically connecting assembled elements in adjoining cells of a multicell storage battery. The connectors are preferably made beneath the cover to reduce the length of the interconnecting link, and therefore, reduce the voltage loss at high rate discharges and to improve the appearance of the top of the battery.

In one type construction, commonly referred to as an up-and-over intercell connection, a notch or opening is provided in the top portion of each partition separating the cells through which the interconnecting link extends at a level even with or slightly below the top edge of the partition. A one-piece cover is sealed to the container with an adhesive. Typically, the adhesive is applied to the cover and top portion of the connector and the cover positioned in sealing engagement with the partitions container walls and the intercell connectors. A fluid-tight seal around the connector is necessary to prevent leakage of electrolyte from cell to cell with a consequent battery discharge.

One of the major developments in the storage battery industry in recent years has been the fabrication of covers and thin-wall containers from thermoplastic materials, such as from polypropylene as disclosed in U.S. Pat. 3,388,007. Among the advantages provided by these thin-wall containers are increased battery capacity while maintaining standardized outside dimensions, a substantial reduction in the battery weight, reduced cost of material for container fabrication and improved appearance. Since both the cover and container are fabricated from a thermoplastic material, an additional advantage offered by this type battery is the capability of heat sealing the cover to the container. A heated platen or similar means is used to soften the top edges of the partitions and outer walls of the container and portions of the cover to be bonded to the container. The cover is then installed onto the container with the application of pressure and, upon cooling, welding joints having superior structural integrity are formed between the cover and the container.

Heat sealing is readily adaptable to the use of automatic equipment, such as that disclosed in copending application Serial No. 56,235 filed July 16, 1970 which is a continuation of Serial No. 625,550 filed on March 23, 1967 now abandoned and assigned to the assignee of the present invention, for performing the sealing operation at high production rates. Additionally, heat sealing eliminates the cost and time required to apply and cure an adhesive.

Although prior art up-and-over intercell connectors are quite acceptable for conventional battery containers where adhesives are used, covers cannot be heat sealed onto thinwall thermoplastic containers utilizing them because of the inability of obtaining a fluid-tight seal between the thermoplastic cover and the metallic connector.

BRIEF SUMMARY OF THE INVENTION

A primary object of this invention is to provide a multicell storage battery utilizing up-and-over intercell connector construction and having the capability of the cover being heat sealed to the container, and a method for producing same.

Another object of this invention is to provide such a battery with an improved seal at the intercell connection against electrolyte leakage between adjoining cell compartments.

Other objects and advantages of this invention will become apparent to those skilled in the art upon reading the following detailed description of the preferred embodiments.

According to this invention, a multicell battery container and one-piece cover are fabricated from a thermoplastic material, such as polypropylene, and notches or openings are provided in the upper portions of the partitions separating the container into cell compartments at appropriate locations for facilitating the assembly of conventional up-and-over intercell connections between battery elements in adjoining cell compartments. The battery elements are positioned into the cell compartments and are mechanically and electrically connected through these notches by a connector link formed by conventional techniques with the top surface thereof being spaced below the top edge of the partition. The connector link is encapsulated with a thermoplastic material, such as ethylene vinyl acetate compounds or similar material, with the top surface of the thermoplastic encapsulation being level with or slightly above the top edge of the partition. The top edges of the partition, the top edges of the outer walls of the container, the top surface of the thermoplastic encapsulation and selected areas of the cover to be sealed to the container are softened with a heat platen or other suitable means and, while these areas are still in the softened condition, the cover is installed onto the container with the application of pressure. Upon cooling, welded, fluid-tight joints are formed between the cover and the container, including the joint between the cover and the top surface of the encapsulation.

In one embodiment, a mold having a cavity surrounding the connector link is positioned on opposite sides of the partition in the vicinity of the notch and the thermoplastic material is introduced into the cavity so that the connector link is encapsulated therewith. In a preferred embodiment, upstanding connector lugs connected to the battery elements are provided with a cavity adjacent the partition wall. The cavity is filled with the thermoplastic encapsulating material to provide a further seal against electrolyte leakage between the cell compartments. This seal prevents the migration of electrolyte by capillary action up along the partition wall and through the notch into the adjoining cell compartment.

DESCRIPTION OF THE PREFERRED EMBODIMENTS

Figure 1:
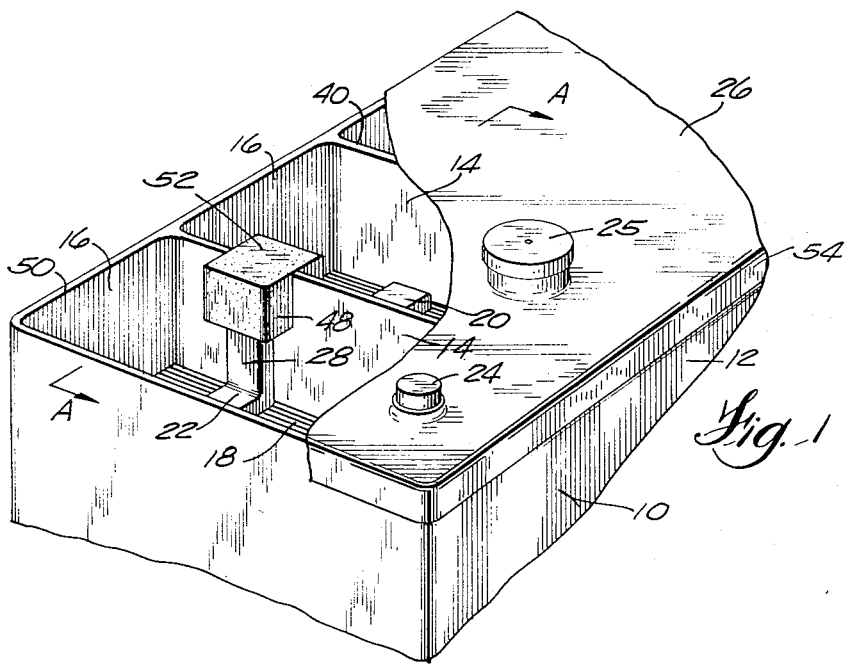
FIG. 1 is a fragmentary, perspective view of an assembled, multicell storage battery with part of the cover broken away to show an up-an-over intercell connector made in accordance with this invention.
Figure 2:
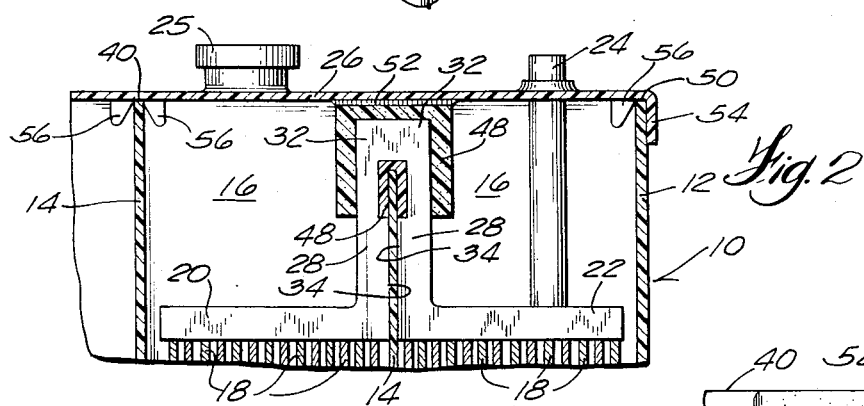
FIG. 2 is a fragmentary, side elevation view, partially a cross section, taken along the plane designated by A—A in FIG. 1.

FIGS. 1 and 2 show a battery 10 comprising a thermoplastic container 12 having at least one partition 14 molded integrally with the container 12 to form cell compartments 16. A battery element 18, including positive and negative plates alternately arranged with suitable separators, is installed in each cell compartment. Straps 20 and 22 connect plates of opposite polarity, e.g. strap 20 is connected to all the negative plates in one cell and strap 22 is connected to all the positive plates of the adjacent cell. The elements in the cell compartment are provided with terminal posts 24 (only one shown) which extend upwardly through thermoplastic cover 26 for an external electrical connection. Each cell compartment 16 is provided with a filling port and vent cap 25 which is removed to add water to the battery as needed.

Figure 3:
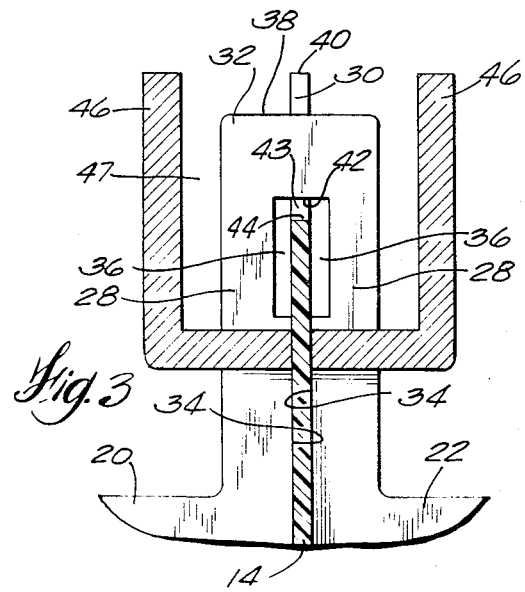
FIG. 3 is a fragmentary, side elevation view, partially a cross section, showing an up-and-over intercell connector with a mold in place prior to the installation of the encapsulation according to this invention.
Figure 4:
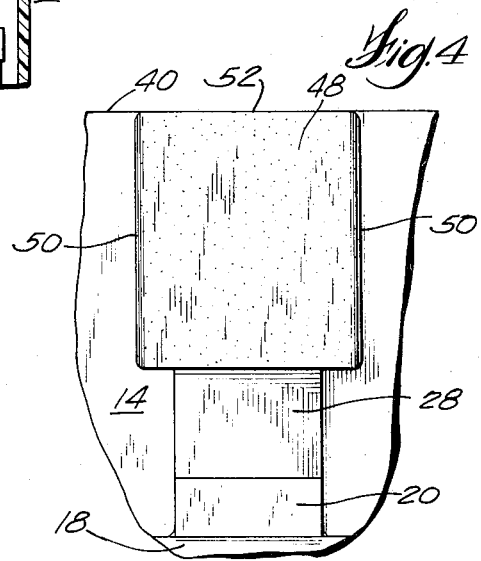
FIG. 4 is a fragmentary, end elevation view of the intercell connector with the thermoplastic encapsulation installed ready for heat sealing.

Straps 20 and 22 (other than those having a terminal post 24 thereon) are provided with an upstanding connector lug 28. Connector lugs 28 are connected through notch 30 provided in the upper portion of partition 14 by connector link 32 as shown in FIGS. 2 and 3. The straps and connector lugs are preferably made from lead with or without small quantities of alloy ingredients, such as antimony, arsenic, etc. Connector lugs 28 are preferably cast integrally with straps 20 and 22, although they can be burned onto the straps in a separate step if desired. The straps are connected to the plates of the elements in any conventional manner, preferably cast to the plates, such as by the method described in U.S. Pat. 3,087,005.

The inside surfaces 34 of connector lugs 28 are flat and are in engagement with partition 14. Preferably, connector lugs 28 are provided with a cavity 36 in the upper portion which is filled with thermoplastic material as described hereinafter. Cavity 36 can extend above the bottom 44 of notch 30 as shown in FIG. 3 or top thereof can be below the bottom of the notch, if desired to obtain more engagement between surface 34 of lugs 28 and partition 14.

Elements 18 are installed into cell compartment 16 by suitable means with connector lugs 28 aligned with notch 30 in partition 14. Notch 30 is made of the desired configuration by any suitable means, such as by punching, prior to the installation of the elements into the cell compartments. The notches are preferably free of any burrs or other particles which could interfere with and prevent a fluid-tight seal at the partition.

After installation and proper positioning of elements 18, connector link 32 is formed in a conventional manner. For example, a conventional steel mold (not shown), such as described in U.S. Pat. 3,259,525, adapted to be lowered over connector lugs 28 and partition 14, is moved into position. Heat is then applied to the upper portion of connector lugs 28 within the mold, such as by a burning torch, and these upper portions are melted. The molten lead is confined in the mold and cools to produce a completed intercell connector when connector link 32 is formed in notch 30. The mold is configured so that the top surface 38 of the formed connector link 32 is spaced below the top edge 40 of partition 14, as shown in FIG. 3, to accommodate a thermoplastic encapsulation as described hereinafter. As a guide this space can be about $\frac{3}{16}$ to $\frac{1}{4}$ inch. The mold can be configured so that the bottom surface 42 of the formed connector link 32 is in sealing engagement with the bottom wall 44 of notch 30. Alternately, the mold can be configured so that the bottom surface 42 of the formed connector link is spaced from the bottom wall 44 of notch 30 so that cavity 43 is defined therebetween. Cavity 43 can be filled with the thermoplastic encapsulation as described hereinafter.

After the intercell connections have been completed, mold 46 (shown in cross section in FIG. 3), constructed from a steel or other suitable material, having a cavity 47 which surrounds the upper portion of connector lugs 28 and connector link 32 and adapted to fit against the surface of partition 14, is moved into position. Mold 46, which can be of single- or multiple-piece construction is configured so that the height of cavity 47 is level with or slightly above the top edge 40 of partition 14. A molten thermoplastic material is then introduced, either by gravity feed or under an injection presure, into cavity 47 until the level thereof is substantially even with or slightly above the top edge 40 of partition 14. When the connector lugs are provided with cavity 36 and cavity 43 is provided between the bottom surface 42 of connector link 32 and the bottom wall 44 of notch 30 in accordance with the alternate embodiments of this invention (as shown in FIG. 3), the thermoplastic encapsulating material flows into them during the operation.

After cooling (which can be effected at ambient conditions or expedited by flowing a coolant through mold 46), mold 46 is removed. The outer portions 50 of the thermoplastic encapsulation 48 adheres to the surface of partition 14 to provide a fluid-tight seal. In the alternate embodiments illustrated by FIG. 2, thermoplastic material 48 filling cavities 36 and 43 provides an additional seal against the migration of electrolyte by a capillary action up along partition wall 14 and through notch 30 into the adjoining cell compartment.

In an alternate embodiment, the thermoplastic encapsulating material can be preformed into a desired configuration adaptable to the connector lugs, connector link and partition. The preform is installed after the intercell connections have been completed by sliding down over the connector lugs and partition. In order to obtain a fluid-tight seal between the preform and the partition surface, a compatible adhesive is applied to the contacting edges of the preform and/or partition. Also, after installation, the edges of the preform and corresponding portions of the partitions can be heated to a softened condition and a pressure applied to the preform to form a welded joint.

The thermoplastic encapsulation material can be of any material which is compatible with the thermoplastic material of the cover and container (i.e. will adhere thereto), has thermoplastic characteristics (i.e. capable of softening to a flowable condition by the application of heat at a reasonably low temperature and hardening upon cooling) and is substantially chemically inert with respect to sulfuric acid. We have found that ethylene vinyl acetate compounds, such as #07–29–B Imperial Adhesive marketed by Imperial Adhesive Co., Cincinnati, Ohio are particularly adaptable for use in this invention. As a guide, we have found that approximately 8 to 10 grams of this material heated to a temperature in a range of about 375 to 390° F. is sufficient to encapsulate a conventional up-and-over intercell connector with approximately $\frac{1}{8}$ to $\frac{3}{16}$ inch layer of material. This material is then allowed to cool at ambient conditions for approximately 5 minutes prior to removing mold 46.

Representative examples of other thermoplastic encapsulating materials which can be used in this invention includes styrene polymers and copolymers, acrylics, cellulosics, polyolefinic plastic material, various fluorocarbon materials and the like. If desired, the same thermoplastic material as that used for the cover and container can be used, in which case the material is injected into mold 46 under pressure.

Since the operating parameters for heat sealing the cover onto the container and the apparatus for performing same are well-known, the detailed description thereof is omitted for the sake of brevity. For the purpose of completeness of disclosure with regard to the heat sealing operation, the entire disclosures of the above-mentioned copending application 625,550 and U.S. Pat. 3,441,448 are incorporated herein by reference thereto. Briefly, the top edges 40 of the partitions 14, the top edges 50 of the outer walls of container 12, the top surface 52 of the thermoplastic encapsulation 48 and selected areas of cover 26 to be sealed to the container are heated to a softened condition by a platen or similar means. While these areas are still in a softened condition, cover 26 is assembled onto container 12 with the application of pressure. Upon cooling the softened areas harden and welded, fluid-tight joints are formed between the cover and container, including the joint between the cover and the top surface 52 of thermoplastic encapsulation 48.

As shown in FIG. 2, cover 26 can be provided with a peripheral flange 54 and guides 56 to facilitate assembly by aligning the partitions and outer walls of the container with the areas of the cover which have been softened. With this arrangement the resultant heat seal joints formed between the cover and container are butt welds. Alternately, the cover can be provided with transverse grooves and a periphal groove adaptable to the partitions and outer walls of the container, respectively. With this latter arrangement the transverse grooves of the cover are provided with enlarged flat areas to accommodate the thermoplastic encapsulation 48.

From the above detailed description it can be seen that this invention provides a simple, inexpensive means for making multicell, thermoplastic storage batteries utilizing up-and-over intercell connectors adaptable to heat sealing, as well as providing a means for obtaining a fluid-tight seal for the intercell connectors.

Although the preferred embodiments of this invention have been illustrated and described in detail, it will be apparent to those skilled in the art that various changes and modifications can be made thereto without departing from the spirit and scope of the invention.

We claim:
1. A multicell storage battery comprising
   (a) a thermoplastic container having outer walls and at least one internal partition dividing the container into a plurality of cell compartments;
   (b) at least one up-and-over intercell connector having a connecting link extending through an opening provided in the upper portion of said partition and electrically connecting battery elements positioned in adjoining cell compartments, the top surface of said connecting link being spaced below the top edge of said partition;
   (c) a thermoplastic encapsulating material covering said connecting link in sealing engagement therewith and in sealing engagement with the opposite walls of said partition around said opening so as to prevent fluid leakage through said opening, the top surface of said thermoplastic encapsulating material being substantially level with the top edge of said partition; and
   (d) a one-piece thermoplastic cover positioned on said container with heat-welded, fluid-tight joints between said cover and said outer walls, said partitions and said thermoplastic encapsulating material.

2. The storage battery according to claim 1 further comprising upstanding lugs connecting said connecting link with said battery elements, said lugs being positioned against the opposite sides of said partitions and provided with a first cavity adjacent to said partition, said cavity containing said thermoplastic encapsulating material in fluid-tight, sealing engagement with said partition walls.

3. The storage battery according to claim 2 wherein said thermoplastic encapsulating material is an ethylene vinyl acetate compound.

4. The storage battery according to claim 2 wherein a second cavity is provided between said connecting link and the walls of said opening, said second cavity containing said thermoplastic encapsulating material in fluid-tight, sealing engagement with the walls of said opening.

5. The method for making a multicell storage battery comprising
   (a) providing a thermoplastic container having outer walls and at least one internal partition dividing the container into a plurality of cell compartments;
   (b) providing an opening in the upper portion of said partition;
   (c) positioning battery elements having upstanding connector lugs electrically connected thereto in the cell compartments and aligning the connector lugs of adjacent battery elements with said openings on the opposite sides of said partitions;
   (d) fusing together the connector lugs of said adjacent battery elements to form a connecting link therebetween through said opening; and
   (e) applying a continuous outer coating of thermoplastic material to the upper portions of said connector lugs and said connecting link which is in fluid-tight, sealing engagement with the opposite walls of said partition around said opening.

6. The method according to claim 5 further comprising softening the top surfaces of said partitions, the top surfaces of said outer walls, a portion of said coating overlaying said connecting link and selected areas of said cover by applying heat thereto and installing said cover onto said container under the application of pressure to form, upon cooling, welded, fluid-tight joints between the previously-softened areas.

7. The method according to claim 6 further comprising providing a cavity in the upper portion of said connector lugs adjacent to said partition walls and filling said cavity with said thermoplastic coating material to form a fluid-tight seal with said partition wall.

8. The method according to claim 7 wherein said thermoplastic material is an ethylene vinyl acetate compound.

References Cited

UNITED STATES PATENTS

| 1,919,902 | 7/1933 | Nyce | 136—134 R |
| 3,259,525 | 7/1966 | Wilson | 136—134 R |
| 3,253,962 | 5/1966 | Deprill et al. | 136—134 R |
| 3,515,597 | 6/1970 | Barnes et al. | 136—134 R |

FOREIGN PATENTS

| 1,116,456 | 6/1968 | Great Britain | 136—134 R |
| 1,903,641 | 9/1969 | Germany | 136—134 R |

DONALD L. WALTON, Primary Examiner

U.S. Cl. X.R.

136—176